United States Patent
Sugawara et al.

(10) Patent No.: US 7,130,026 B2
(45) Date of Patent: Oct. 31, 2006

(54) STAGE CONTROL METHOD, A STAGE CONTROL SYSTEM, AND A SEMICONDUCTOR MANUFACTURING EQUIPMENT

(75) Inventors: Tsukasa Sugawara, Hitachinaka (JP); Akira Fujii, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 89 days.

(21) Appl. No.: 11/047,675

(22) Filed: Feb. 2, 2005

(65) Prior Publication Data
US 2005/0174554 A1    Aug. 11, 2005

(30) Foreign Application Priority Data
Feb. 6, 2004    (JP) ................ 2004-030041

(51) Int. Cl.
G03B 27/58    (2006.01)
G03B 27/32    (2006.01)
H02P 1/00    (2006.01)
(52) U.S. Cl. .................. 355/72; 355/77; 318/135
(58) Field of Classification Search ............ 355/53, 355/72, 75, 77; 318/135
See application file for complete search history.

(56) References Cited
U.S. PATENT DOCUMENTS
6,744,228 B1 *    6/2004    Cahill et al. ........... 318/135
6,859,257 B1 *    2/2005    Korenaga .............. 355/53

FOREIGN PATENT DOCUMENTS
JP    6-43939    2/1994
JP    9-73317    3/1997

OTHER PUBLICATIONS
Translation of JP 6-043939 cited by Applicant.*
Translation of JP 9-073317 cited by Applicant.*
Honda, et al. "Theory and Practice on Servo-control" p. 32, (1995), published by Nikkan-Kogyo Shinbun.

* cited by examiner

Primary Examiner—Alan Mathews
(74) Attorney, Agent, or Firm—McDermott Will & Emery LLP

(57) ABSTRACT

A method of controlling a stage comprising: acquiring a first moving speed of the stage based upon position information from a laser interferometer for measuring a position of the stage; controlling the moving speed of the stage based upon the first speed; determining a second moving speed of the stage based upon the number of rotation of a motor for moving the stage; controlling the moving speed of the stage based upon the second moving speed; and acquiring a ratio of the second moving speed to the first moving speed based upon the first moving speed.

8 Claims, 3 Drawing Sheets

$K_L + K_L = 1$ $0 \leq K_L \leq 1$ $0 \leq K_T \leq 1$

STAGE CONTROL METHOD, A STAGE CONTROL SYSTEM, AND A SEMICONDUCTOR MANUFACTURING EQUIPMENT

CLAIM OF PRIORITY

The present application claims priority from the Japanese patent application Ser. No. 2004-030041, filed on Feb. 6, 2004, the content of which is hereby incorporated by reference into this application.

FIELD OF THE INVENTION

The present invention relates to a stage control method, a stage control equipment for carrying out the method and a semiconductor manufacturing equipment.

RELATED ART

In recent years, circuit patters for semiconductor devices have been becoming densely more and more in order to miniaturizing semiconductor devices. For example, in an electron beam lithography system for drawing circuit patterns as semiconductor manufacturing equipment, working specimens such as a semiconductor wafer into which semiconductor devices are fabricated or a mask for exposing semiconductor device patterns by a lithography technology are placed on a stage which is continuously moved to draw circuit patterns on the working specimens such as the semiconductor wafer or the mask. As the circuit density of the semiconductor devices increases, the drawing speed should be slower than that of conventional circuit density. Thus, a stage control system needs a stable velocity control in a slow velocity range because drawing of finer circuit patterns is done on the working specimen.

As a conventional technology concerning a stage control system, it is known that a control system comprising a servomotor as an actuator and a control device to feedback a detected rotational velocity of the servomotor as disclosed in non-patent publication No. 1. In this technology, the stability of the stage moving velocity depends on capability of the detector for detecting the rotational velocity. Particularly, in the case of rotation detectors such as the rotational velocity detectors, an S/N ratio of an output voltage of the detector becomes worse in a low velocity range. That is, the stability of the stage velocity becomes worse in such a low velocity range as 1/100 or less of a velocity ratio (i.e. a ratio of the minimum velocity to the maximum velocity).

Further, in servo-controlling the motor for driving the stage, position information of the stage based on a laser interferometer system is changed over with position information of the stage based on pulses from a rotary encoder of the motor under the condition whether it is possible to detect the stage position by the laser interferometer system for detecting the stage position so as to utilize the pulses from the rotary encoder of the motor in an area where a high accuracy is not needed. As a result, it is known that a length of a reflection mirror in the laser interferometer system is shortened as disclosed in Patent document No. 1.

In moving the stage at a high velocity, it is not a good policy to conduct a velocity feed back using the position information from the laser interferometer system for measuring the stage position, because stage vibration signals may enter into the position information due to twist or strain, etc. generated in the stage and driving force transmission system.

However, in the above-mentioned technology wherein since a position of switching the control depending on the length of the reflection mirror is limited in advance, the control by the position information from the rotary encoder of the motor is not conducted; there is a problem in the technology that the accuracy of the position detection of the stage decreases because the stage vibration components may merge into the velocity signals.

Further, a technology is known wherein in order to realize a positioning device with maintenance free and high accuracy positioning of a motor for moving a stage, a high-speed movement of a stage controlled only by a rotational signal of the motor is conducted, and wherein switching between a coarse positioning of the stage controlled based on stage position information from laser interferometer device and a rotational number signal and fine positioning of the stage controlled based only on stage position information from the laser interferometer system is conducted based on the stage position information from the laser interferometer system, as disclosed in patent document No. 2. In this case, since control patterns are switched based only on the stage position information from the laser interferometer system irrespective of the stage moving velocity, as same as the technology disclosed in the patent document No. 1, the detection accuracy of the stage position may decrease because the stage vibration components merge into the velocity signals.

Patent document No. 1: Japanese patent Laid-open 06-43939 (FIG. 1)

Patent document No. 1: Japanese patent Laid-open 09-73317 (FIG. 1)

Non-patent document No. 1: Theory and Practice on Servo-control, by Honda et al, p. 32, (1995), published by Nikkan-Kogyo Shinbun

SUMMARY OF THE INVENTION

An object of the present invention is to provide a stage control method, which is capable of controlling a stage at high accuracy, a stage control equipment for realizing the method and a semiconductor manufacturing equipment.

The present invention provides a stage control method, which comprises controlling a first moving velocity of a stage based on a moving velocity of the stage acquired by stage position information from a laser interferometer for measuring the stage position, controlling the stage moving velocity based on a second stage moving velocity acquired by a rotational speed from a rotational speed detector of a motor for driving the stage.

Further, the stage moving velocity is controlled based on deviation between the acquired velocity and a predetermined target moving velocity.

According to the present invention, because the movement of the stage is controlled in accordance with the stage moving velocity, and because it is not necessary to determine control specifications in advance, a stage control with a high accuracy is expected.

DETAILED DESCRIPTION OF THE PREFERRED EMBODIMENTS

Figure 2:
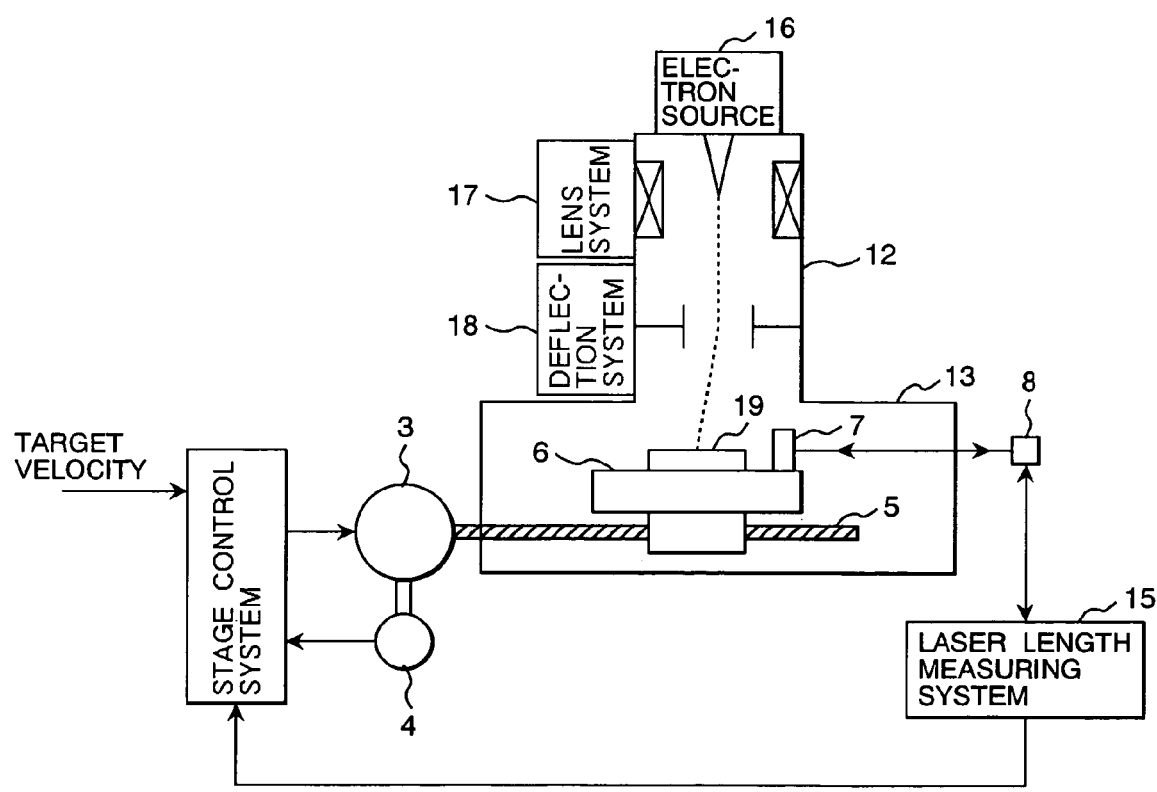
FIG. 2 is a diagrammatical, vertical cross sectional view of a semiconductor manufacturing equipment.

In the following, embodiments will be explained by reference to drawings. FIG. 2 is a diagrammatical, vertical cross sectional view of a semiconductor manufacturing equipment according to the present invention. As an example, there is shown an electron beam lithography system, which draws circuit patterns by irradiating electron beams onto a specimen.

The electron beam lithography system comprises, in general, an electron optics system 12, a working chamber 13, a stage control system 14, and a laser interferometer system 15. The electron optics system 12 comprises an electron source 16 from which electron beams are taken out, a lens system 17 for focusing the electron beams, and a deflection system 18 for deflecting the electron beams, wherein the electron beams are irradiated onto desired portions of the specimen 19.

The working chamber 13 is provided with the stage 6 on which the specimen 19 is placed. The electron optics system 12 and the working chamber 13 are kept vacuum.

A ball screw 5 to which the servomotor 3 is connected rotates to move the stage 6 in a straight direction. The stage 6 is provided with a reflection mirror 7; laser light from the laser interferometer system 15 is reflected by the mirror 7 and the reflected light is detected by a light receiver 8 to detect the stage position.

On the other hand, the rotational number of the servomotor 3 is detected by the rotation detector 4 to detect the velocity of the stage 6. The stage control system 14 calculates a rotational speed of the servomotor 3 from the stage velocity information acquired by the laser interferometer system 15 and the rotation detector 4 thereby to control the servomotor so that the moving velocity of the stage 6 becomes the target velocity.

As an operation of the electron beam lithography system, the specimen 19 is mounted on the stage 6 at first, and the stage 6 is continuously moved while controlling the stage with the stage control system 14 to a desired position where circuit patterns are drawn by electron beams emitted from the electron source 16. The electron beams are focused on the specimen 19 by deflecting them with the deflection system 18.

In circuit patterns of semiconductor devices in recent years, precision in an order of several nanometers is required for a lithography system on a working specimen. Accordingly, the position of the stage 6 should be measured accurately, and an amount of deflection of the electron beams is controlled based on the stage position. Thus, a laser interferometer system 15, which is capable of measuring the position of the stage 6 at a resolution of 1 nanometer or less, has been used.

Figure 1:
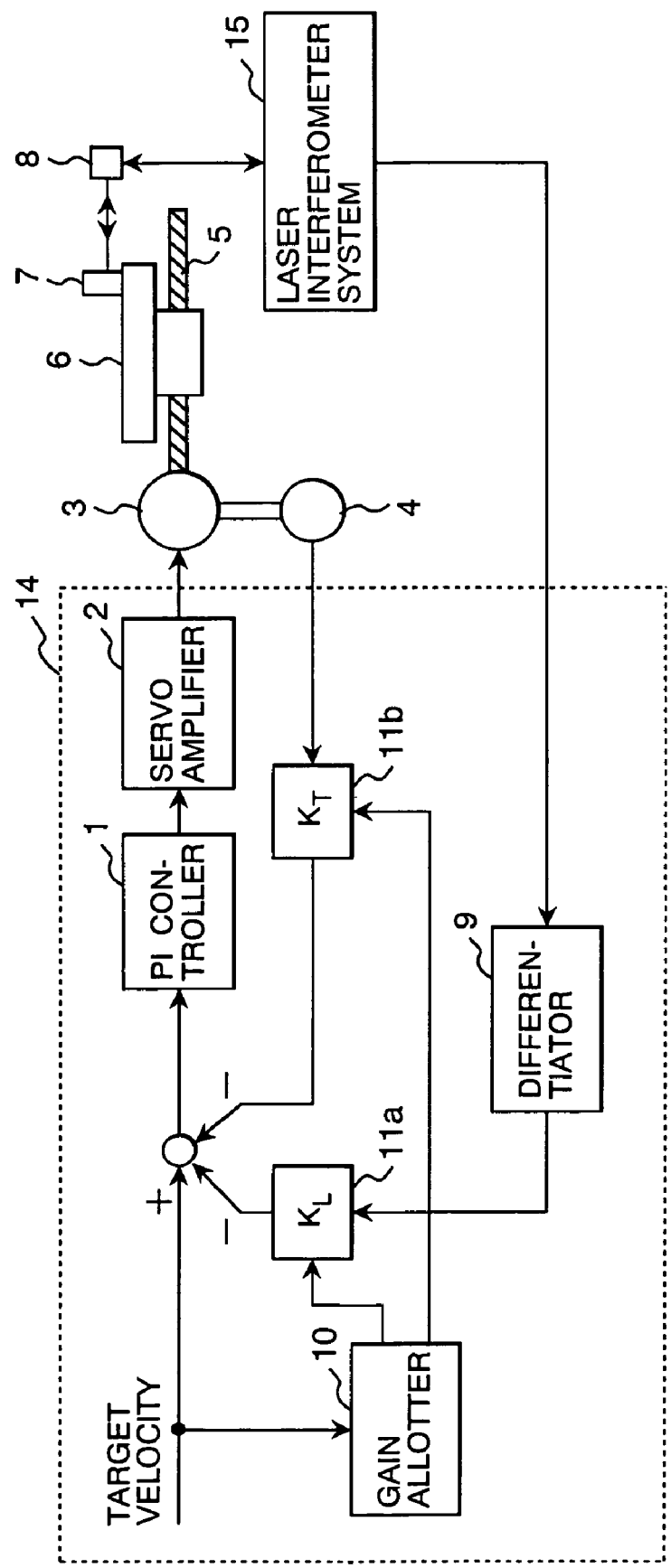
FIG. 1 is a control block diagram of the stage control system.

FIG. 1 shows a control block diagram of the stage control system according to the present invention. A target velocity of the stage 6 is determined based on lithography data. The moving velocity of the stage is acquired by detecting the rotational velocity of the servomotor 3 with the rotation detector 4 such as a rotational velocity sensor and based on time-differentiation of the stage position measured by the interferometer system 15 with a differentiator 9. The respective rates of the moving velocities of the stage are adjusted by the gain controllers 11a and 11b in accordance with the ratio determined by the gain allotter 10 so that the deviation between the stage moving velocity and the target velocity is output as a velocity deviation to the PI (proportional integral) controller 1. The sum of a value obtained by amplifying proportionally the velocity deviation and a value obtained by time-integration of the velocity deviation is output from the PI controller 1.

The output from the PI controller 1 is amplified to such a power that is capable of driving the servomotor 3 by the servo-amplifier 2. The servomotor 3 rotates upon receiving the output from the servo-amplifier 2. As a result, the ball screw 5 connected to the servomotor 3 rotates to move the stage 6.

Next, the operation of the gain allotter 10 and the gain controllers 11a and 11b will be explained. The gain allotter 10 outputs a control signal for allocating a feed-back gain coefficient $K_7$ from the rotation detector 4 and a feed-back gain coefficient $K_L$ from the laser interferometer system 15 in accordance with the target velocity and the gain controllers 11a and 11b alter the feed-back coefficients $K_7$, $K_L$ from the rotation detector 4 and the laser interferometer system 15 in accordance with control signals from the gain allotter 10.

At this time, since the sum of the velocity signals obtained from the rotation detector 4 and the laser interferometer system 15 are feed-backed, it is necessary to make always constant the sum of the feed-back gain coefficient $K_7$ of the rotation detector 4 and the feed-back gain constant $K_L$ of the laser interferometer system 15. Accordingly, the gain allotter 10 allocates the feed-back gain coefficients $K_7$ and $K_L$ so as to satisfy the following equation.

$$K_7 + K_L = 1 \qquad \text{Equation (1)},$$

wherein $0 \leq K_L \leq 1$, $0 \leq K_7 \leq 1$ in the equation (1).

The ratio of the gain allocation in the gain allotter 10 of the stage control system 14 is determined by taking into consideration the velocity ratio of the minimum velocity to the maximum velocity of the stage movement. If comparing the rotation detector 4 with the laser interferometer system 15 as the stage velocity detectors, there is a problem that the rotation detector 4 lessens the S/N ratio of the detected voltage in such a low velocity range that the stage moving velocity becomes 1/100 or less of the velocity ratio.

On the other hand, if employing the laser interferometer system 15, it is possible to carry out a high, accurate velocity detection because a velocity resolution of 5 micro meters per second is obtained when a position measuring resolution is 1 nanometer and a sampling time is 0.2 millisecond for the allotter 9 as a sampling control system. Accordingly, in the area of the low velocity, a quantity of feed-back of the velocity signal from the laser interferometer system 15 is increased and a quantity of the velocity signal from the rotation detector 4 is decreased, thereby to improve the velocity stability in the low velocity range.

Further, in a range of such a high velocity ratio as 1/100 or more of the stage moving velocity, since the reflection mirror is strained and a distance between the reflection mirror 7 and the receiving element 8 changes by the influence of the twist or strain of the power transmission system or the stage 6, so that the stage vibration signals may merge into velocity signals from the laser interferometer system 15. Accordingly, it is not advisable to conduct velocity feedback using the position information of the laser interferometer system, but it is advisable to conduct velocity feed-back based on the velocity signals of the rotation detector 4.

Figure 3:
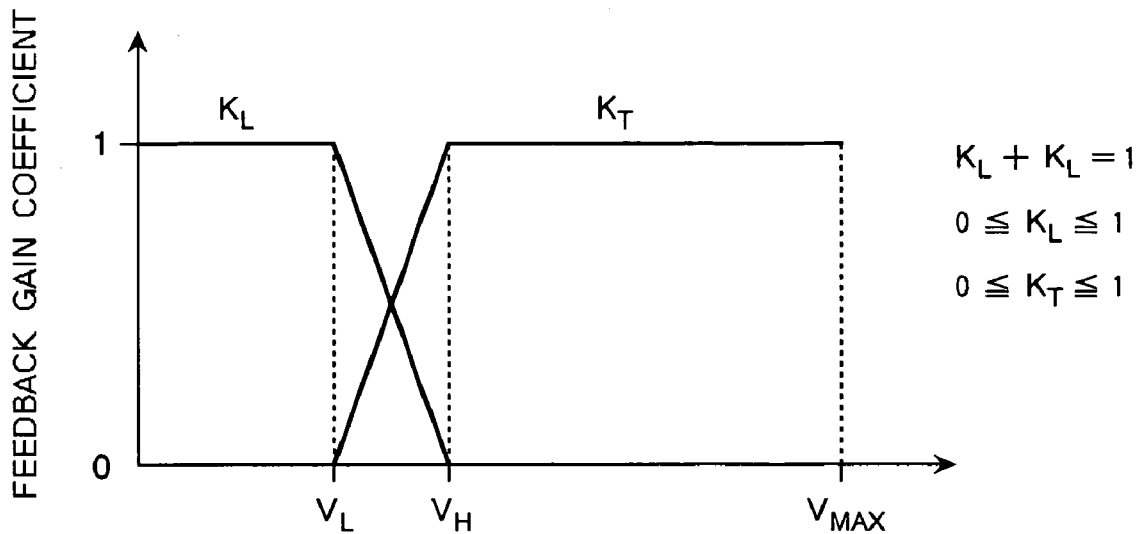
FIG. 3 is a graph showing relationship between a stage velocity and a feedback gain coefficient.
Figure 4:
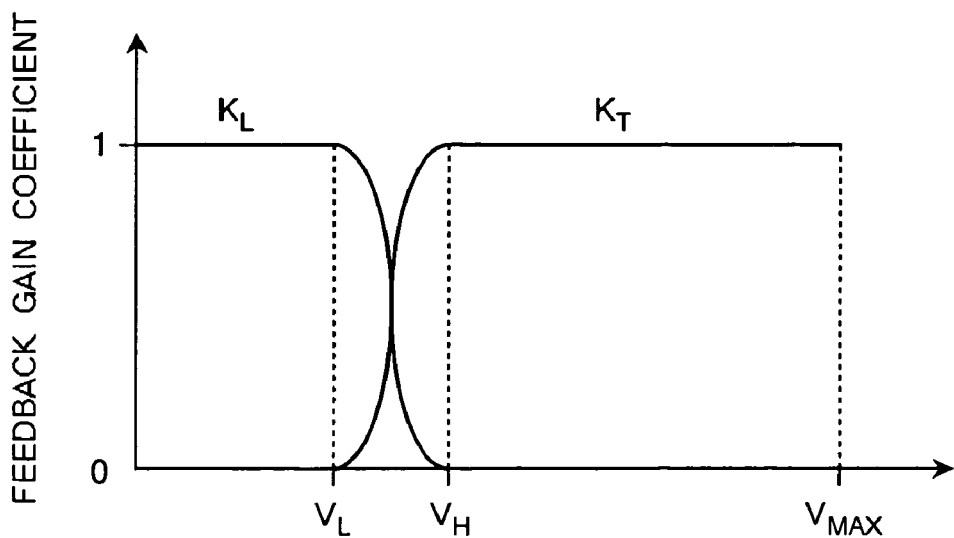
FIG. 4 is a graph showing another example of relationship between the stage velocity and the feedback gain coefficient.

FIGS. 3 and 4 are graphs showing relationships between the stage velocity and the feedback gain coefficients. In FIG. 3, when the maximum velocity of the stage 6 is $V_{MAX}$, the limited velocity $V_L$ to be controlled by the stage moving velocity acquired by the rotation detector 4, the limited velocity to be controlled by the stage velocity acquired by the laser interferometer system 15 $V_H$, the feed-back gain coefficient $K_L$ is 1 and the feed-back gain coefficient $K_7$ is zero in a range where the target moving velocity of the stage is slower than the limited velocity $V_L$.

In an area of high velocity where the target velocity is from the limited velocity $V_H$ to $V_{MAX}$, the feedback gain coefficient $K_7$ is 1, and the feedback gain coefficient $K_L$ is zero.

If the target velocity is from the limited velocity $V_L$ to $V_H$, the deviation between the stage moving velocity acquired by the laser interferometer system 15 and the stage velocity acquired by the rotation detection device 4 becomes the deviation between the feedback gain coefficient $K_L$ and the feed-back gain coefficient $K_7$, so that the stage velocity is controlled to be drastically changed. Accordingly, the stage velocity is controlled smoothly by changing the ratio of the feedback gain coefficient $K_L$ to the feedback gain coefficient $K_7$ so as to meet the condition of the equation (1).

As having been described above, since the present invention performs the control of the stage 6 based on the stage moving velocity acquired by the laser interferometer system 15 in a slow velocity range and the stage velocity acquired by the rotation detector 4 into which the stage vibration components does not merge, so that the control with a high accuracy over the entire velocity range can be done.

FIG. 4 shows another example of a control where the target velocity is within a range of from the limited velocity $V_L$ to $V_H$, wherein the ratio of the feed-back gain coefficient $K_L$ to the feed-back gain coefficient $K_7$ is controlled by a given function of a high order, not by the linear function. Thus, the moving velocity of the stage can be controlled smoothly.

As having been described, according to the present embodiment, it is possible to control the moving velocity of the stage with a high accuracy because a stable feedback using the laser interferometer system can be done in a low velocity range at a velocity ratio of 1/100 or less where the S/N ratio of the detection signal becomes worse. In this embodiment, the feedback of the velocity signal is conducted by disposing a velocity detector using the stage position information acquired by the laser interferometer system, in addition to the velocity control system using the rotation detector.

Further, there are various kinds of rotation detectors such as optical encoder types, magnetic encoder types, etc. Since the present embodiment does not feedback the detected information of the rotation velocity to the stage velocity in a velocity range lower than the limited velocity $V_L$, an expensive and high accurate rotation detector is not necessary even at a low velocity area, leading to reduction of the cost.

The application of the highly accurate stage velocity control system according to the present invention makes it possible to manufacture fine semiconductor devices with high accuracy.

What is claimed is:

1. A method of controlling a stage, which comprises:
    a first step for acquiring a first moving velocity of the stage based upon position information from a laser interferometer for measuring a position of the stage;
    a second step for controlling the first moving velocity of the stage based upon the first moving velocity;
    a third step for determining a second moving velocity of the stage based upon the rotation speed of a motor for driving the stage;
    a fourth step for controlling the second moving velocity of the stage based upon the second moving velocity; and
    a fifth step for acquiring a ratio of the second moving velocity to the first moving velocity based upon the first moving velocity.

2. The method of controlling the stage according to claim 1, wherein the second step or the fourth step controls the moving velocity of the stage by acquiring a deviation between a predetermined target velocity and the moving velocity acquired in the first or second step.

3. The method of controlling the stage according to claim 1, wherein the fifth step selects, in accordance with a moving velocity of the stage, one of a case where the control according to the second step and the control according to the fourth step coexist and a case where one of the controls of the second step and the fourth step is performed.

4. The method of controlling the stage according to claim 1, the fifth step gradually changes a ratio of a gain of the moving velocity of the second step to a gain of the moving velocity in the fourth step.

5. A stage control system comprising: a controller for acquiring a first stage moving velocity based upon position information measured by a laser interferometer, for acquiring a second stage moving velocity based upon a rotating velocity of a motor for driving the stage, the rotating speed being detected by a rotation speed detector, and for controlling the stage moving velocity based upon one or both of the first stage moving velocity and the second stage moving velocity, and an allotter for determining a ratio of the first stage moving velocity to the second stage moving velocity based upon the first stage moving velocity or the second stage moving velocity.

6. The stage control system according to claim 5, wherein the control device further controls the stage moving velocity based upon a deviation between a predetermined target velocity and the first stage moving velocity or the second stage moving velocity.

7. The stage control apparatus according to claim 5, wherein the allotter selects, in accordance with a moving velocity of the stage, one of a case where the control according to the second step and the control according to the fourth step coexist and a case where one of the controls of the second step and the fourth step is performed.

8. A semiconductor manufacturing equipment comprising:
    a stage for mounting a working specimen;
    a laser intereferometer for measuring a stage position;
    a rotation detector for detecting a rotation speed of a motor for driving the stage;
    a control system for acquiring a first stage moving velocity based on the stage position information measured by a laser interferometer, for acquiring a second stage moving velocity based on the rotation speed detected by the rotation detector, for determining a ratio of the first stage velocity to the second stage velocity based on the first and second stage velocities, and for controlling the stage moving velocity, and a column for exposing the specimen while moving the stage.

* * * * *